(12) United States Patent
Torii et al.

(10) Patent No.: US 6,288,464 B1
(45) Date of Patent: Sep. 11, 2001

(54) MOTOR HAVING WORM GEAR MECHANISM

(75) Inventors: Katsuhiko Torii, Hamamatsu; Keiji Inoue, Hamana-gun; Hiroaki Yamamoto, Kosai, all of (JP)

(73) Assignee: Asmo Co., Ltd., Shizouka (JP)

( * ) Notice: Subject to any disclaimer, the term of this patent is extended or adjusted under 35 U.S.C. 154(b) by 0 days.

(21) Appl. No.: 09/536,399

(22) Filed: Mar. 28, 2000

(30) Foreign Application Priority Data

Jul. 13, 1999 (JP) .................................................. 11-199048
Jul. 13, 1999 (JP) .................................................. 11-199049

(51) Int. Cl.[7] .............................. H02K 7/108; B60J 1/00
(52) U.S. Cl. ........................... 310/78; 310/75; 192/223.2
(58) Field of Search ................................... 310/78, 75 R; 192/223.2, 38

(56) References Cited

U.S. PATENT DOCUMENTS

| 3,050,321 | * | 8/1962 | Howe et al. ........................ 192/223.2 |
| 3,476,226 | * | 11/1969 | Massey .............................. 192/223.2 |
| 4,227,104 | * | 10/1980 | Hamman ............................ 310/75 R |
| 4,877,113 | * | 10/1989 | Taig ................................. 192/223.2 |
| 5,959,385 | * | 9/1999 | Kato et al. ........................... 310/112 |

FOREIGN PATENT DOCUMENTS 60-18667    6/1995  (JP) ............................... F16D/41/06

* cited by examiner

Primary Examiner—Burton S. Mullins
(74) Attorney, Agent, or Firm—Law Office of David G. Posz

(57) ABSTRACT

A motor used in a power window system includes a motor section, a warm-gear included output section and a one-way clutch. The one-way clutch is disposed between a motor's shaft and a worm's shaft. The one-way clutch includes a drive member having at least a pair of guide surfaces, driven member coupled with the drive member, a stationary housing, and a rotary member disposed between the driven member and the stationary member and between the pair of guide surfaces. The motor and the one-way clutch has a common member fixed to both the motor and the one-way clutch.

20 Claims, 12 Drawing Sheets

MOTOR HAVING WORM GEAR MECHANISM

CROSS REFERENCE TO RELATED APPLICATION

The present application is based on and claims priority from Japanese Patent Applications: Hei 11-199048, filed on Jul. 13, 1999, and Hei 11-199049, filed on Jul. 13, 1999, the contents of which are incorporated herein by reference.

BACKGROUND OF THE INVENTION

1. Field of the Invention

The present invention relates to an electric motor having a one-way clutch and a worm gear mechanism, which is used in a power drive system such as a vehicle power window system.

2. Description of the Related Art

A motor used in a power window system has a speed reduction worm mechanism. The worm mechanism has a worm shaft which is coaxially linked to the armature shaft of the motor. When the motor rotates, the rotation speed of the motor is transmitted to the worm shaft and reduced by the worm mechanism. Thus, torque is increased and transmitted to a window regulator to open or close a window.

If a window is forced to open from outside while the motor is not operated, an outside torque is applied to rotate the motor via the window regulator. If the motor is rotated by the outside torque, the window can be opened. As a result a door can be opened without a key.

It has been proposed that a one-way clutch is inserted between the worm shaft and the armature shaft. Such a one-way clutch allows the motor to rotate the worm gear mechanism and prohibits the worm gear mechanism to rotate the motor.

However, it is difficult to insert such an ordinary one-way clutch if the armature shaft and the worm shaft is out of alignment. In addition, such a one-way clutch makes the motor size larger.

SUMMARY OF THE INVENTION

A main object of the invention is to provide an improved motor having a one-way clutch which can solve the above-stated problem.

Another object of the invention is to provide a compact motor having a one-way clutch.

According to a feature of the invention, a motor includes a motor section, a worm mechanism, and a one-way clutch disposed between the motor section and the worm mechanism. The one-way clutch includes a drive member connected to a motor shaft, a driven member connected to a worm shaft, and a clutch housing which integrally includes a worm bearing. Therefore, the one-way clutch can be inserted easily, and the motor size can be made compact. In addition, the number of parts can be reduced.

According to another feature of the invention, motor includes a motor section including an armature and an armature shaft, an output section including a worm mechanism having a worm shaft disposed coaxially with the armature shaft, and a one-way clutch disposed between the armature shaft and the worm shaft. The clutch includes a drive member connected to the armature shaft, a driven member connected to the worm shaft, and a clutch housing which integrally includes a drive-member bearing.

The output section include a worm housing and a worm bearing to support the worm shaft coaxially with the armature shaft, and the clutch housing can be fixed to the worm bearing.

The one-way clutch can include a rotary member disposed between the driven member and the housing, and the drive member controls location of the rotary member to restrict the driven member if the driven member rotates the drive member, and to free the driven member if the drive member rotates the member. The driven member can have a plurality of control surfaces, and the rotary member is disposed between one of the plurality of control surfaces and the clutch housing. The drive member also can have a plurality of guide surfaces for controlling location of the rotary member.

According to another feature of the invention, a motor includes a motor section including an armature, a commutator, and an armature shaft, an output section including a worm mechanism having a worm shaft, a worm bearing supporting the worm shaft coaxially with the armature shaft, and a one-way clutch disposed between the armature shaft and the worm shaft. The one-way clutch includes a drive member having at least a pair of guide surfaces and connected to the armature shaft, driven member connected to the worm shaft, a stationary housing for accommodating the drive member and driven member, and a rotary member disposed between the driven member and stationary member and between the pair of guide surfaces. The motor section and the clutch has a common member fixed to both the motor section and the clutch.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A motor according to a first embodiment of the invention is described with reference to FIGS. 1–9.

Figure 9:
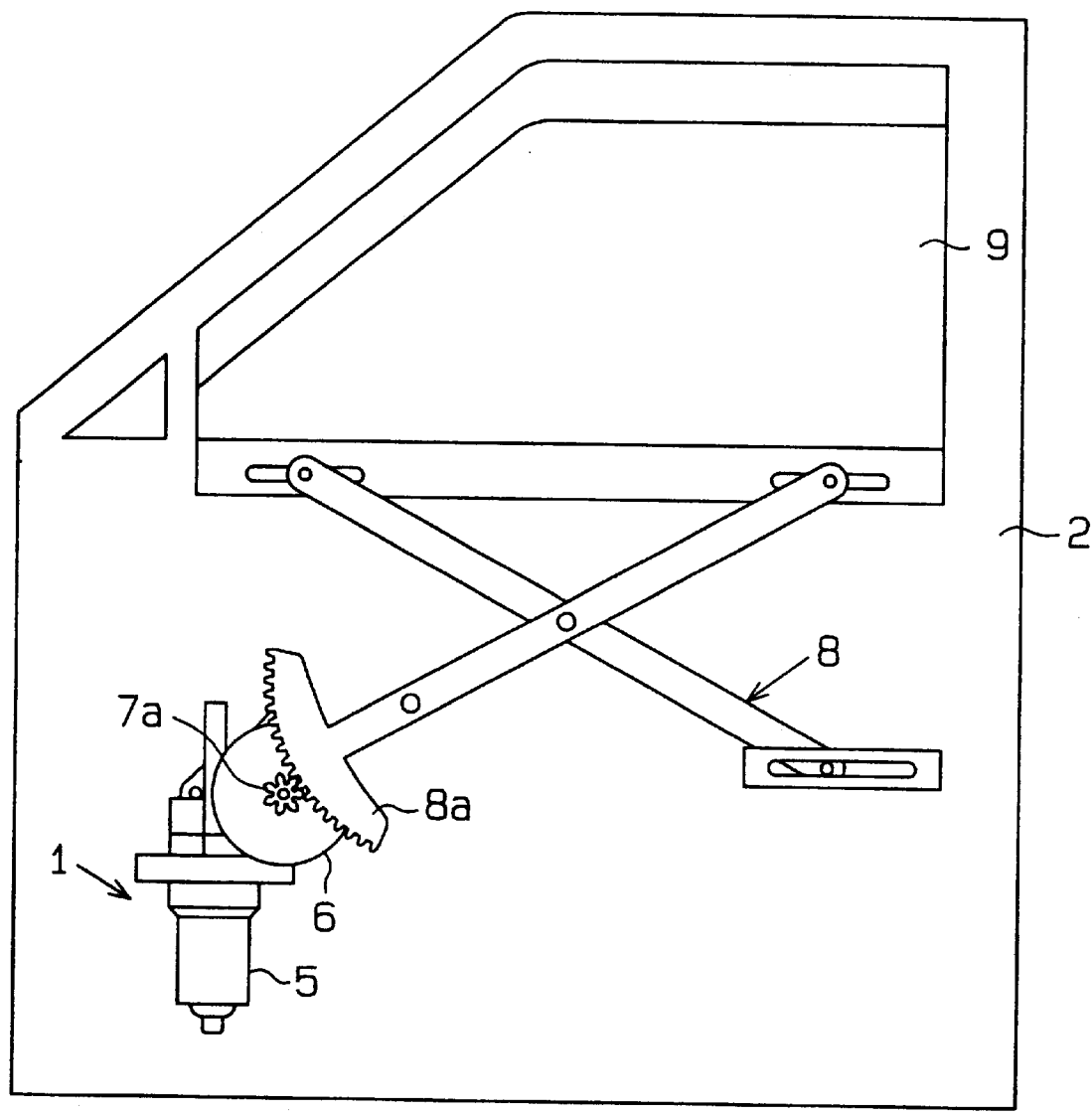
FIG. 9 is a schematic diagram illustrating a power window system for a vehicle.

As illustrated in FIG. 9, motor 1 is mounted in a power window system of a vehicle door 2. Motor 1 includes motor section 5 and output section 6 which has output shaft 7. Rotation of motor section 5 is transmitted from gear 7a, which is formed on output shaft 7, via gear 8a which is formed on an arm of window regulator 8. Window regulator 8 opens window 9 if motor 1 rotates in one direction, while it closes window 9 if motor 1 rotates in the other direction.

Figure 2:
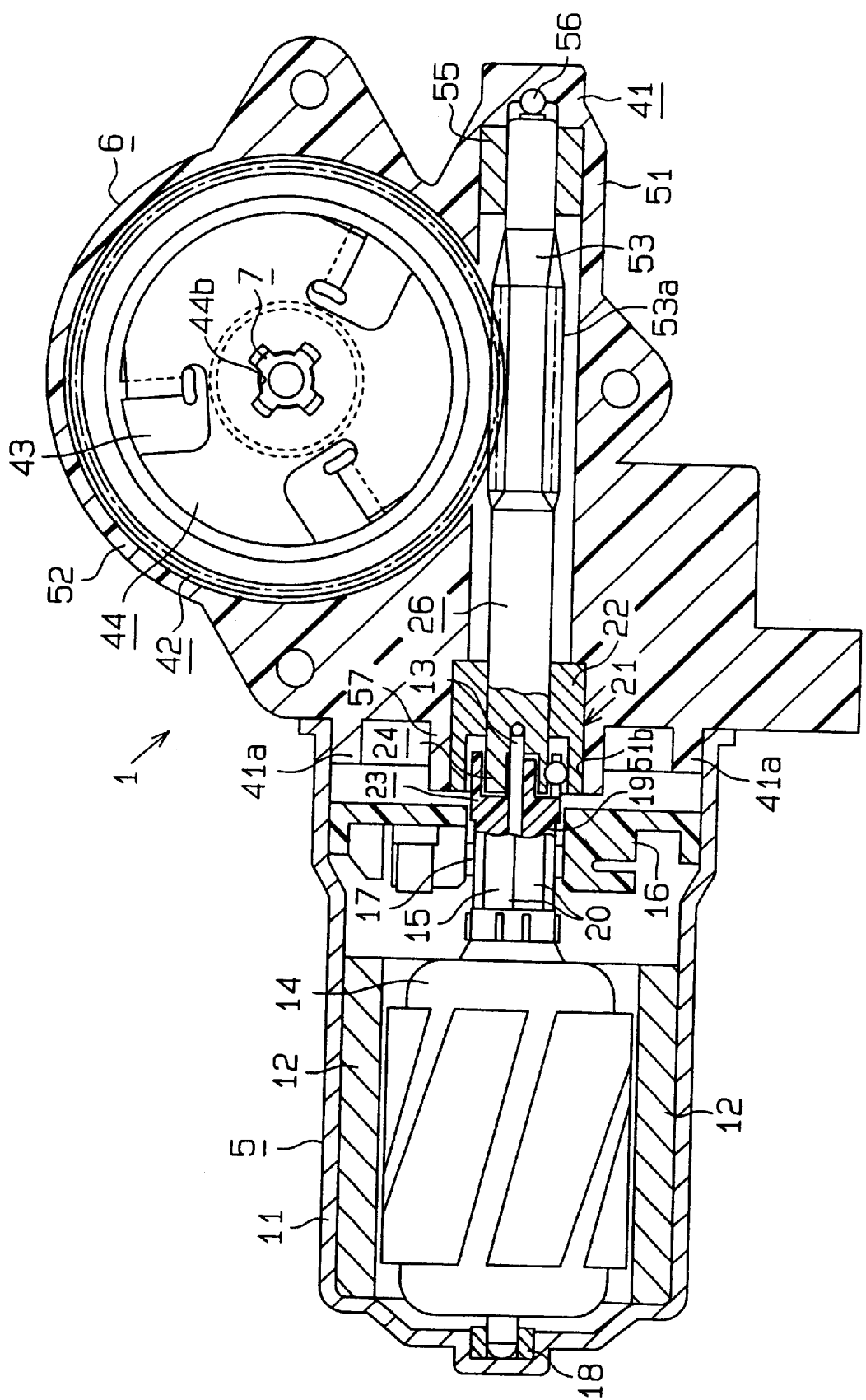
FIG. 2 is a cross-sectional longitudinal view of the motor according to the first embodiment.
Figure 3:
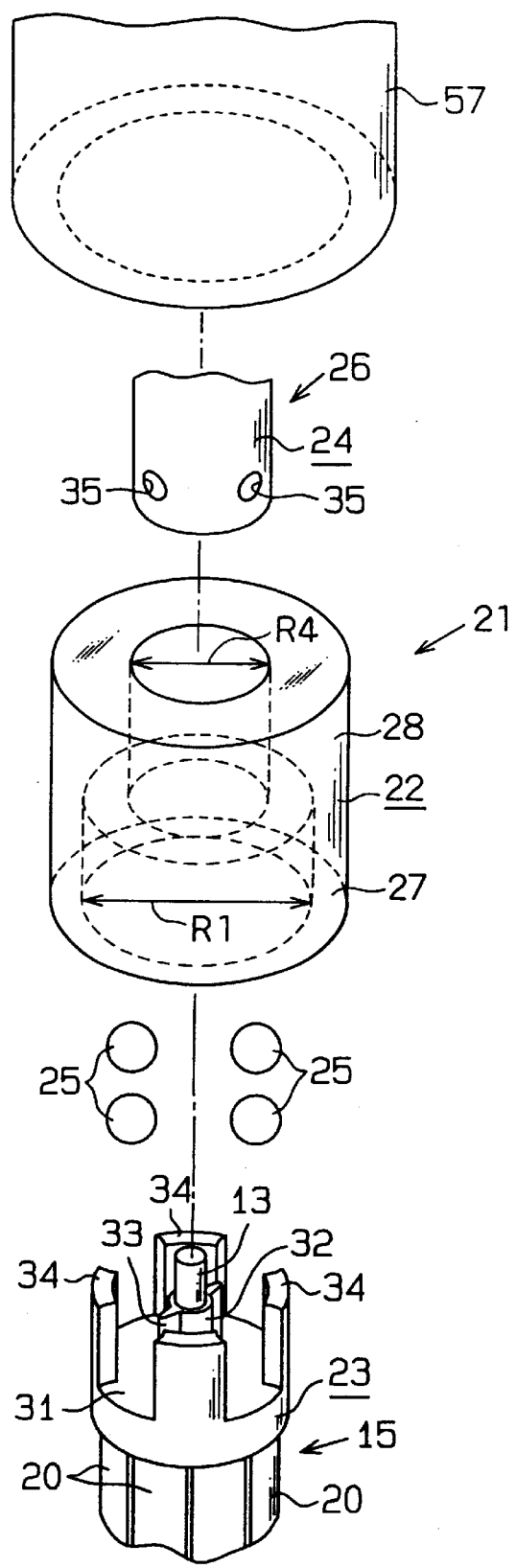
FIG. 3 is an exploded perspective view of a clutch of the motor according to the first embodiment.

As shown in FIG. 2, motor section 5 is comprised of cylindrical motor housing 11, a pair of permanent magnets 12, armature shaft 13, armature 14, commutator 15, brush holder 16 and a pair of brushes 17. Motor housing 11 has a bottom which supports armature shaft 13 via bearing 18 at the center thereof. The pair of permanent magnets 12 is fixed to opposite portions of the inner periphery of motor housing 11 around armature 14. Commutator 15 is fixed to the upper end of armature 14. Commutator 15 is comprised of resin-made body 19 and a plurality of commutator segments 20 fixed and insulated by body 19. Motor housing 11 has an open end, to which brush holder 16 is force-fitted.

The pair of brushes 17 is held in brush holder 16 to be in contact with commutator 15. Electric current is supplied to armature 14 by the pair of brushes 17 through commutator 15.

One-way clutch 21 is disposed at the front end of commutator 19, or the front end of motor section 5. As shown in FIGS. 3–6, clutch 21 is comprised of joint housing 22, resin-made drive member 23, driven member 24, and four steel balls 25.

Joint housing 22 has cylindrical clutch housing portion 27 having the inner periphery of radius R1 and worm bearing 28 having the inner periphery of radius R4 which is smaller than radius R1. Joint housing 22 is fixed to a stationary portion of output section 6. Worm bearing 28 rotatably supports worm shaft 26. Worm shaft 26 has shaft portion 53 and worm gear 53a formed thereon.

Figure 4:
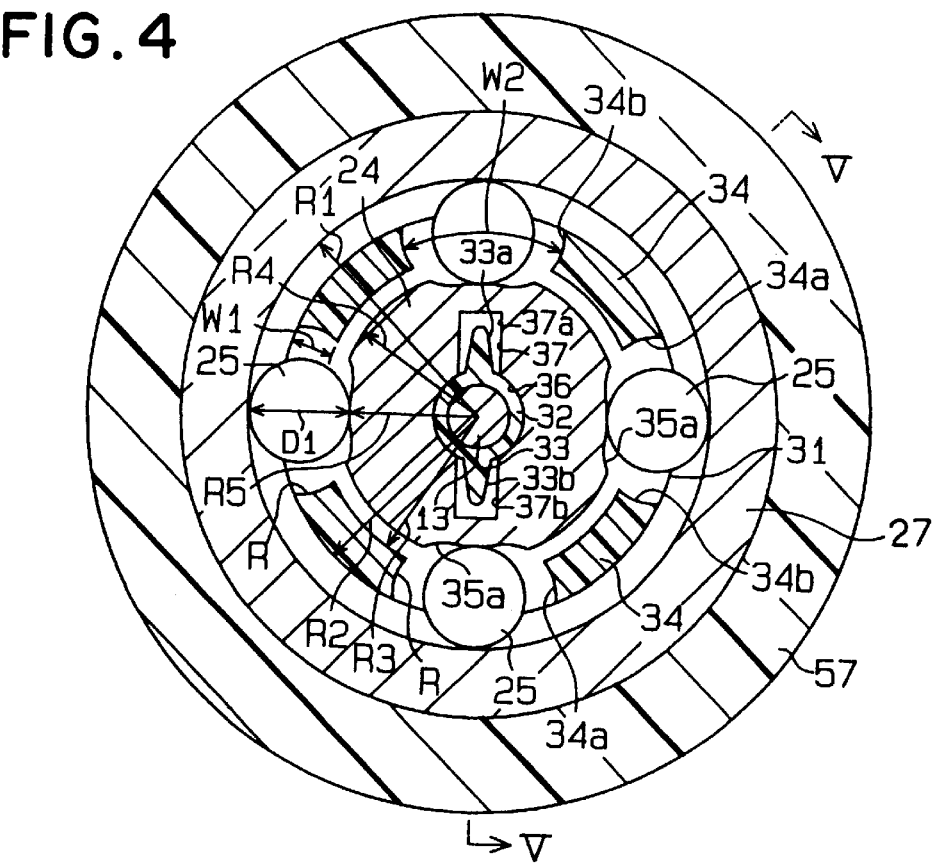
FIG. 4 is a cross-sectional plan view of the clutch.

Drive member 23 is disposed in clutch housing portion 27 as shown in FIG. 4. Drive member 23 has disk portion 31, central projection pole 32, and four teeth 34 axially extending from disk portion 31 at equal intervals. Teeth 34 are formed integrally with disk portion 31. Disk portion 31 and teeth 34 has outer peripheries of radius R2, which are a little larger than the outer periphery of commutator 15 and a little smaller than the inner periphery of clutch housing portion 27. Projection ring 32 has a center hole through which armature shaft 13 extends and a pair of triangular projections 33 projecting radially outward.

Each tooth 31 has an inside radius R3 and a radial thickness W1, which is the difference between the radiuses R2 and R3. Each tooth 31 has also concave first and second guide surfaces 34a and 34b at circumferentially opposite sides, which have a radius R so as to be in linear contact with ball 25. The circumferential distance W2 between two teeth, or between first guide surface 34a of one tooth 31 and second guide surface 34b of another tooth 31, is larger than the radial thickness W1.

Each ball 25 is disposed to be in contact with the inner periphery of clutch housing portion 27 in one of control areas between first guide surface 34a of one tooth 31 and second guide surface 34b of another tooth 31. Each ball 25 has an outside diameter D1 that is larger than thickness W1.

Driven member 24 is formed integrally with worm shaft 26 at one end thereof. Driven member 24 has four concave control surfaces 35 at cylindrical outer surface thereof. The cylindrical outer surface has a radius R4 that is approximately the same as worm shaft 26 and smaller than the inside radius R3 of tooth 34. As shown in FIG. 4, control surfaces 35 have a central height and concave side-floors 35a. The center of the central height has a radius R5, a little smaller than the radius R4 of the cylindrical outer surfaces. The difference in radius between R1 of the clutch housing's inner periphery and the radius R5 of control surface 35 is approximately equal to the outside diameter D1 (=2R) of balls 25. The radius of concave side-floors 35a is a little smaller than the radius R5 of control surfaces.

Thus, control surfaces 35 provide different distances between control surfaces 35 and clutch housing portion 27 as the location of balls 25 changes. Control surface 35 provides a shorter distance between control surface 35 and clutch housing portion 27 as ball 25 leaves the center of control surface 35. Control surfaces 35 respectively correspond to the control areas between first guide surface 34a of one tooth 31 and second guide surface 34b of another tooth 31, where the location of balls 25 are controlled by guide surfaces 34a and 34b between the control surfaces 35 and the inner periphery of clutch housing portion 27, as described later.

Driven member 24 has a keyhole-like engagement hole 36 and cylindrical center hole 38. Engagement hole 36 has a pair of generally rectangular holes 37, to which the pair of projections 33 is inserted. An end of armature shaft 13 is loosely fitted into center hole 38. In other words, a portion of worm shaft 26 functions as a bearing of armature shaft 13.

As shown in FIG. 4, each projection 33 has right first engagement surface 33a and left second engagement surface 33b. Each rectangular hole 37 has first engagement surface 37a engageable with projection's first engagement surface 33a and second engagement surface 37b engageable with projection's second engagement surface 33b.

Output section 6 is comprised of gear housing 41, gear wheel 42, rubber cushion 43, output plate 44, cover plate 45, and output shaft 7.

Gear housing 41 has worm housing portion 51, wheel housing portion 52, and generally elliptic male flange 41a, which is force-fitted to motor housing 11.

Figure 5:
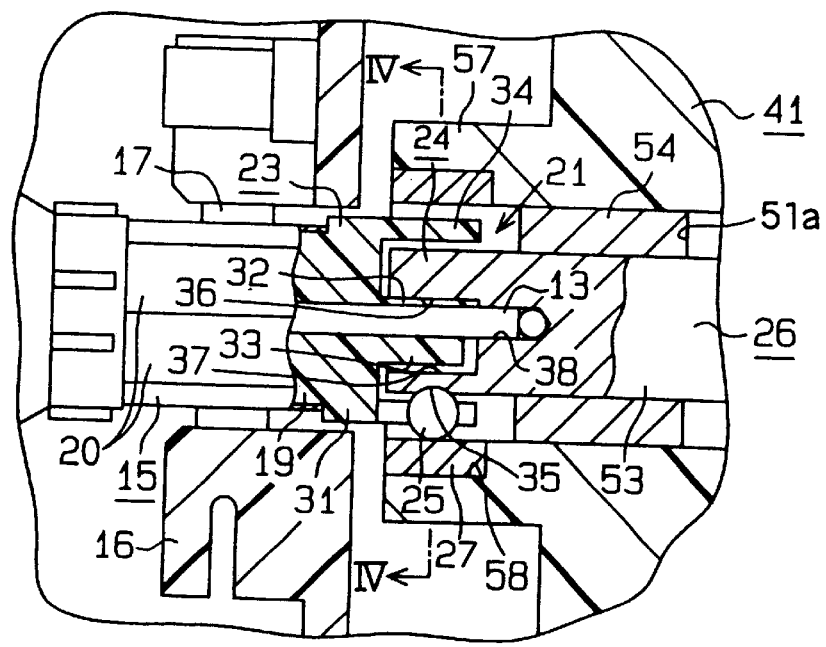
FIG. 5 is a cross-sectional side view of the clutch.
Figure 6:
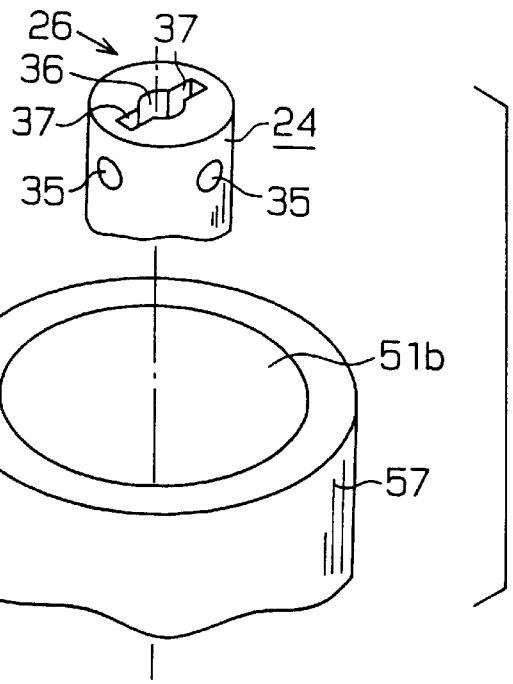
FIG. 6 is a fragmentary exploded perspective view of the clutch.

Worm housing portion 51 is a cylindrical member having a bottom at the upper end thereof, a central bore whose diameter is approximately the same as the inner periphery of clutch housing portion 27, joint chamber 51b whose inside diameter is equal to the outside diameter of joint housing 22, and cylindrical projection 57. Joint housing 22 is force-fitted from projection 57 into joint chamber 51b to be in abutment with bottom 51a of joint chamber 51b as shown in FIG. 5.

Worm shaft 26 is inserted into the central bore 53, and supported by worm bearing 28 at one end thereof and sliding bearing 55 and thrust bearing 56 at the other end. Accordingly, joint housing 22 functions as a part of clutch 21 and a part of output section 6.

Before worm shaft 26 is inserted into worm housing portion 51, it is inserted into joint housing 22. Balls 25 are inserted between control surfaces 35 of driven member 24 and the inner periphery of clutch housing portion 27. Subsequently, drive member 23, together with armature shaft 13 and armature 14, is inserted into clutch housing portion 27 so that each ball 25 can be disposed between tooth 34, as described above. Then, worm shaft 26 is inserted into worm housing portion 51 until one end thereof abuts thrust bearing 56, and joint housing 22 is force-fitted into joint chamber 51*b*. As a result, motor section 5 and output section 6 can be united.

Figure 1:
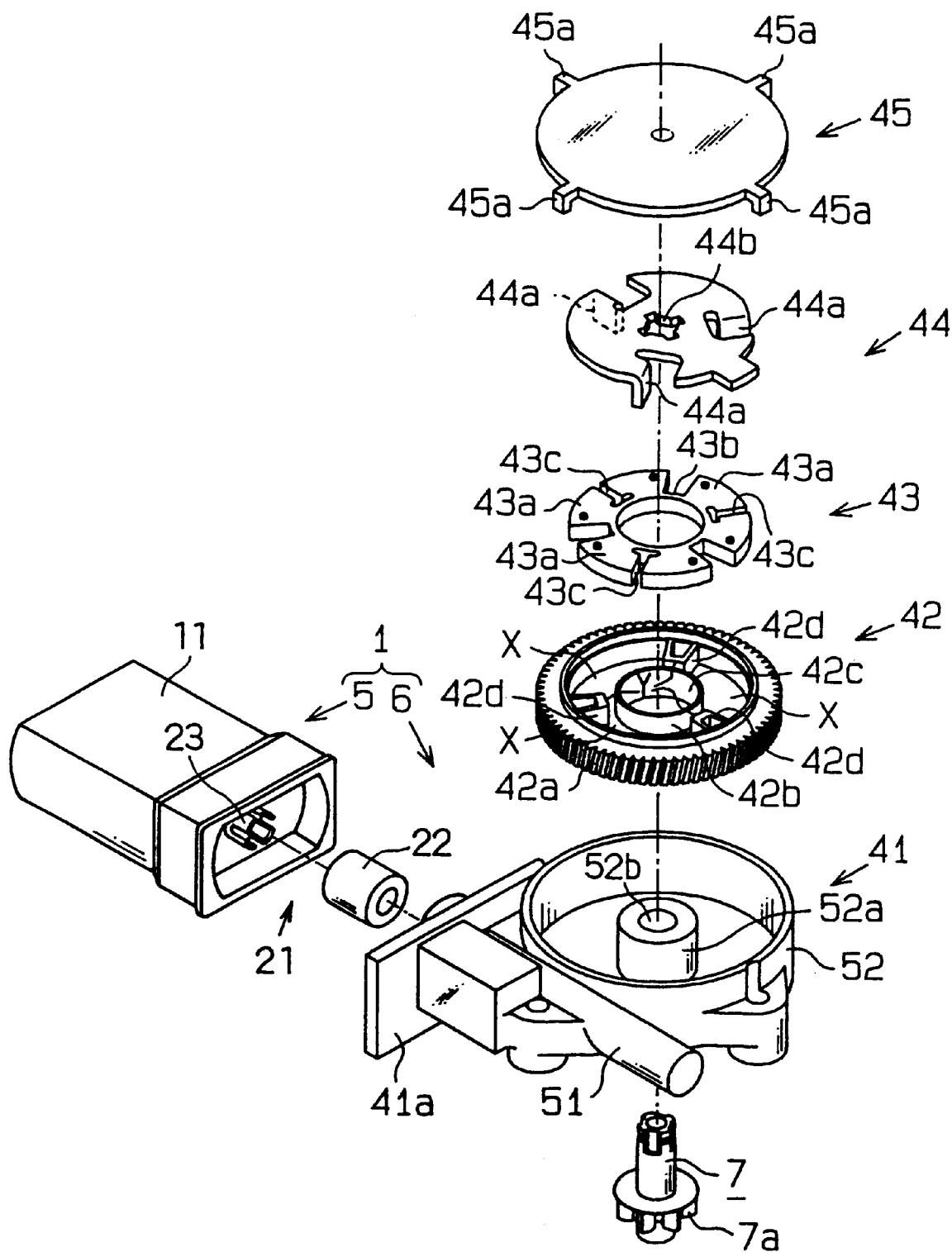
FIG. 1 is an exploded perspective view of a motor according to a first embodiment of the invention.

As shown in FIG. 1, wheel housing portion 52 is also a cylindrical member having a bottom which has cylindrical sliding wall 52*a* at the center thereof. Sliding wall 52*a* has center hole 52*b* to which output shaft 7 is rotatably inserted.

Gear wheel 42 has worm wheel portion 42*a* in mesh with worm 53*a*, cylindrical wall 42*b* formed at the center thereof, and three U-shaped partitions 42*d* formed around cylindrical wall 42*b* at equal intervals (i.e. 120 degree in angle). Cylindrical wall 42*b* has center hole 42*c*, to which sliding wall 52*a* of wheel housing portion 52 is rotatably inserted. Partitions 42*d* define three compartments X which are circumferentially connected with each other by grooves Y.

Rubber cushion 43 has three fan-shaped cushion portions 43*a* and connection ring portion 43*b*. Each cushion portion 43*a* has radially extending groove 43*c* and is fitted to one of compartment X, so that rubber cushion 43 can rotate together with gear wheel 42.

Output plate 44 is a metal plate which has three arms 44*a* cut therefrom to extend downward and center hole 44*b*. Each arm 44*a* engages one of grooves 43*c* of rubber cushion 43, so that gear wheel 42 can rotate output plate 44 via rubber cushion 43. Center hole 44*b* has four notches formed at equal intervals so that the end of output shaft 7 is fitted thereto, as shown in FIG. 2. Thereafter, output shaft 7 is rotated by output plate 44.

Wheel housing portion 52 is covered by disk-like plate cover 45 having four claws 45*a* which extend radially outward. Each claw 45*a* is bent radially inward against the outer periphery of wheel housing portion 52. Accordingly, plate cover 45 restricts axial movement of output shaft 7.

Gear 7*a* of output shaft 7 meshes window regulator 8, as described previously.

The operation of clutch 21 is described with reference to FIGS. 7A–8B.

Figure 7A:
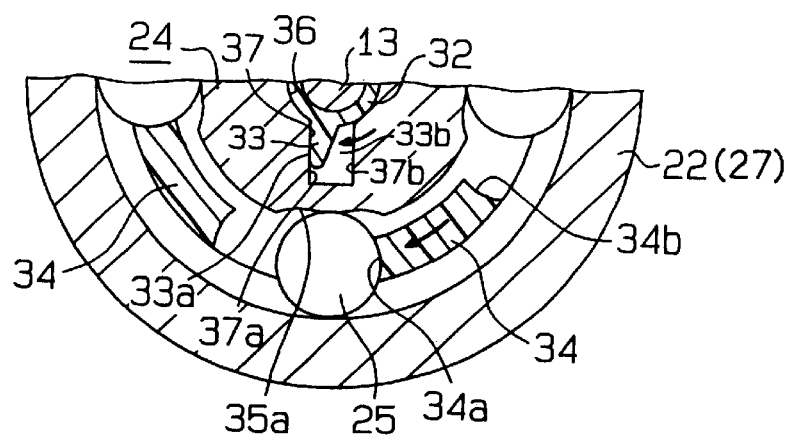
FIGS. 7A and 7B are fragmentary cross-sectional plan views of the clutch.
Figure 7B:
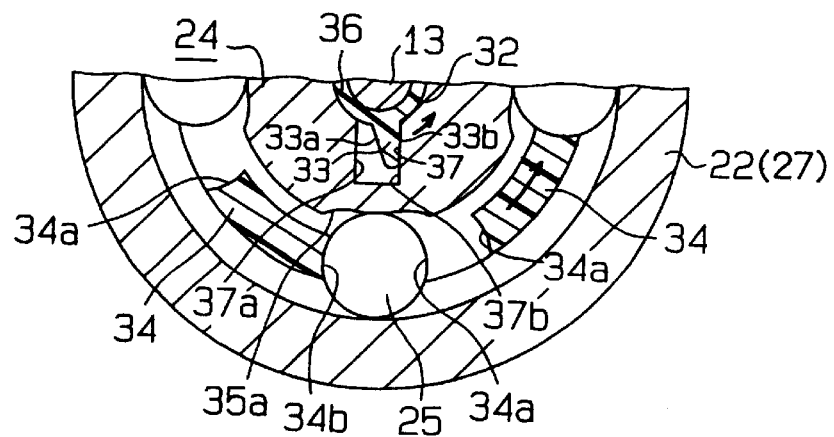

If drive member 23 rotates clockwise, first engagement surface 33*a* of drive member 23 pushes first engagement surface 37*a* of rectangular hole 37, and first guide surface 34*a* of tooth 31 locates ball 25 on the center of the central height of driven member 24 to be neutral and rotatable, as shown in FIG. 7A. If drive member 23 rotates counter-clockwise, second engagement surface 33*b* of drive member 23 pushes second engagement surface 37*b* of rectangular hole 37, and second guide surface 34*b* of tooth 31 locates ball 25 on the center of the central height to be neutral and rotatable, as shown in FIG. 7B. Therefore, drive member 23 is not prevented from rotating driven member 24 in either direction.

Figure 8A:
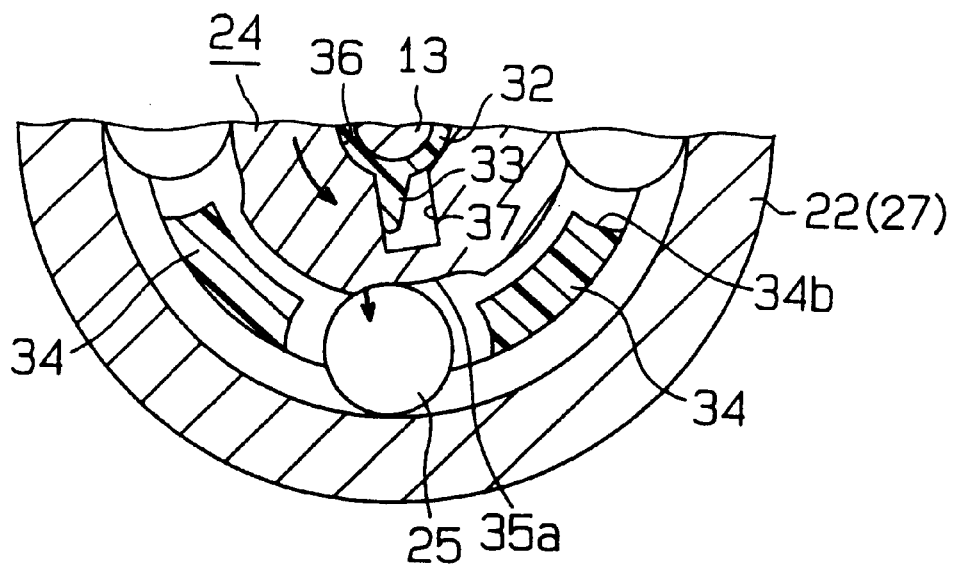
FIGS. 8A and 8B are fragmentary cross-sectional plan view of the clutch.
Figure 8B:
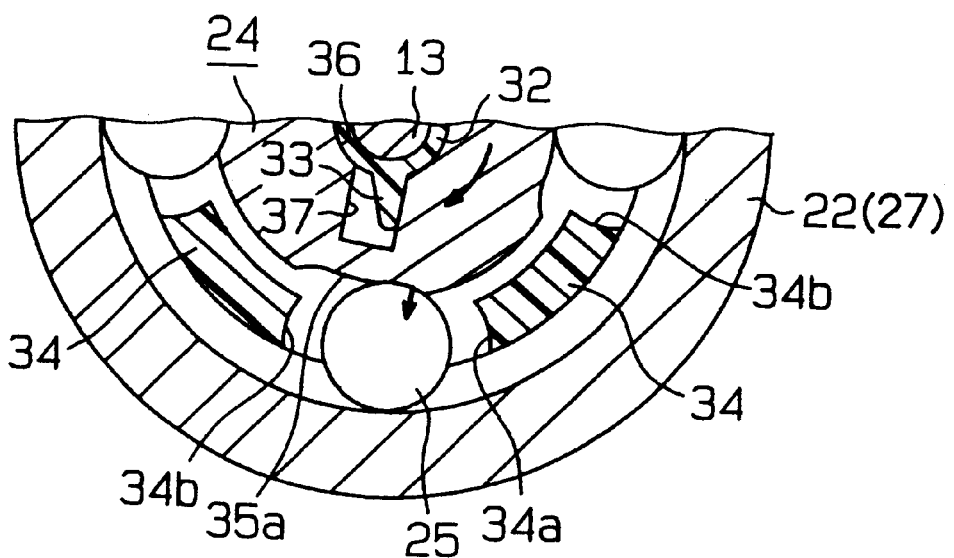

On the other hand, if driven member 24 rotates drive member 23 clockwise or counter-clockwise, as shown in FIGS. 8A and 8B, ball 25 is rolled by driven member 24 and leaves first or second guide surface 34*a*, 34*b* and is left behind the central height of control surface 35 since the drive member 23 is not rotated. When ball 25 is moves to one of the circumferential edges of control surface 35, it is caught or sandwiched between control surface 35 and the inner periphery of stationary joint housing 22, as shown in FIGS. 8A and 8B. As a result, drive member 23 is not further rolled or moved by driven member 24.

If a force is exerted on a window pane of window 9 while motor 1 is not turned on, torque is transmitted through output shaft 7, output plate 44, rubber cushion 43, gear wheel 42, and worm shaft 53 to driven member 24. However, balls 25 are soon caught between control surfaces 35 and the inner periphery of joint housing 22. As a result, driven member 24 is stopped from further rotating, and window is not opened further.

(Second Embodiment)

Figure 10:
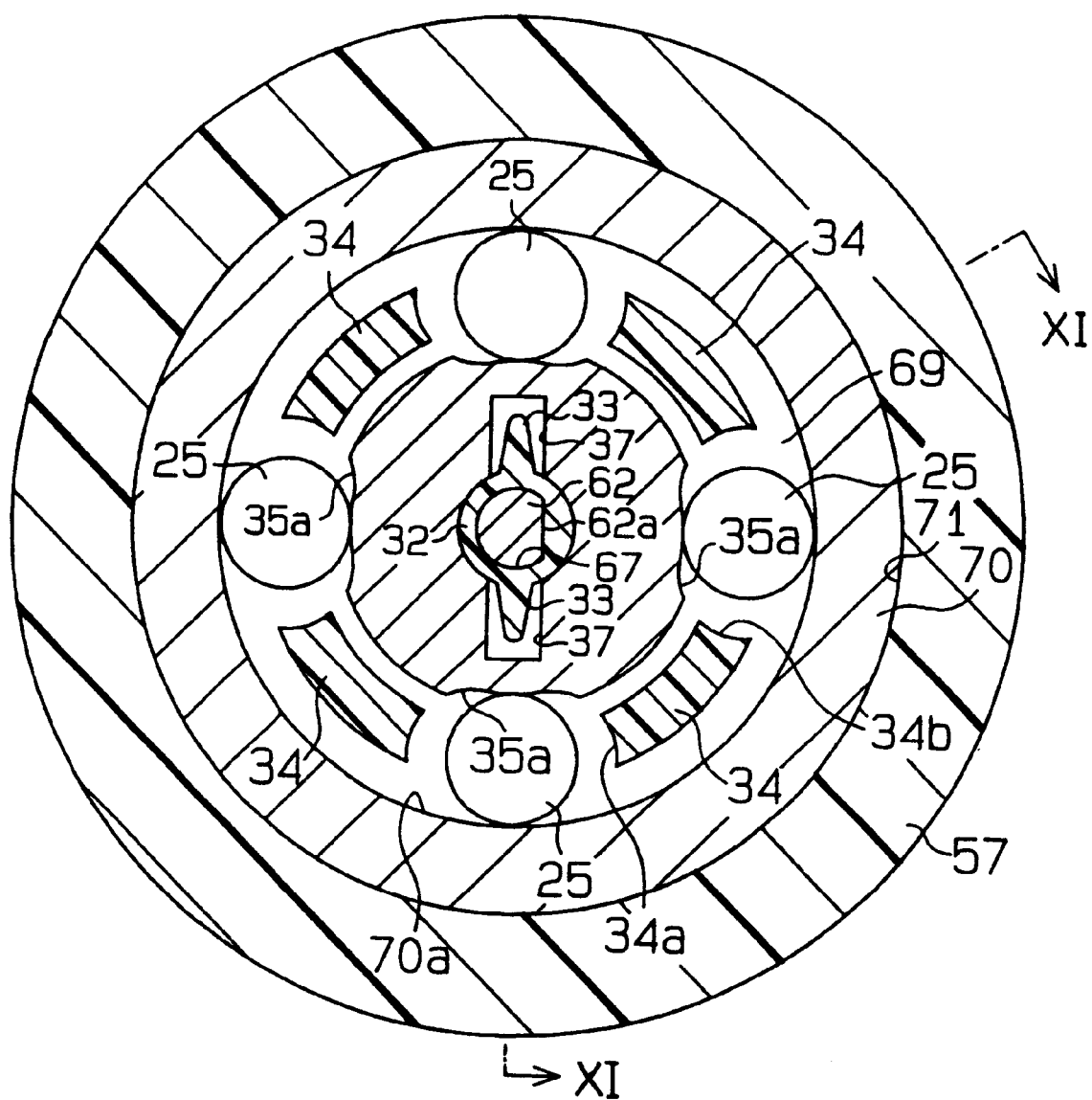
FIG. 10 is a fragmentary cross-sectional plan view of a clutch of a motor according to a second embodiment of the invention.
Figure 11A:
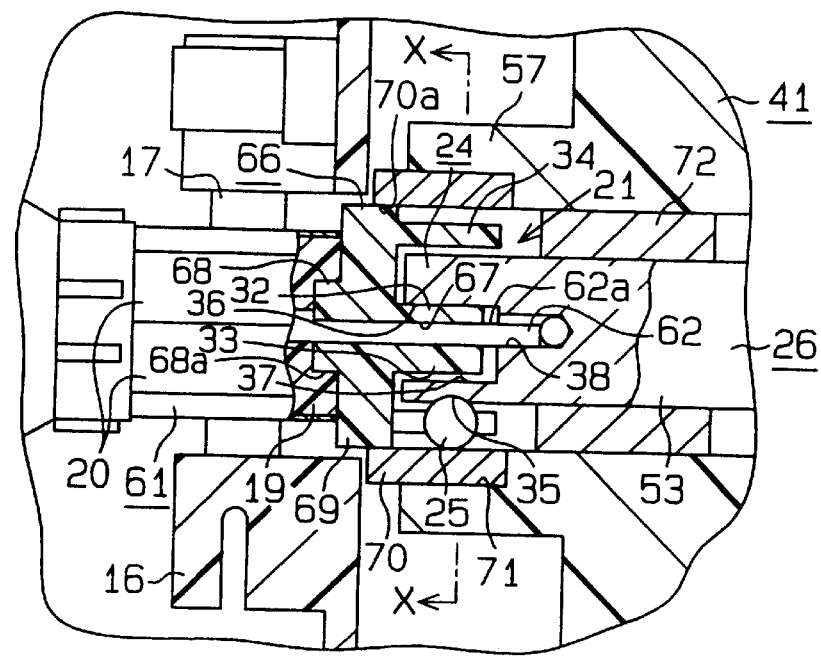
FIG. 11A is a fragmentary cross-sectional side view of the clutch cut along line XI—XI in FIG. 10.

A motor according to a second embodiment of the invention is described with reference to FIGS. 10–12.

The same reference numeral as the first embodiment corresponds to the same or substantially the same portion or component.

Joint housing 22 is divided into two members, clutch housing 22 and worm bearing 54.

Figure 12:
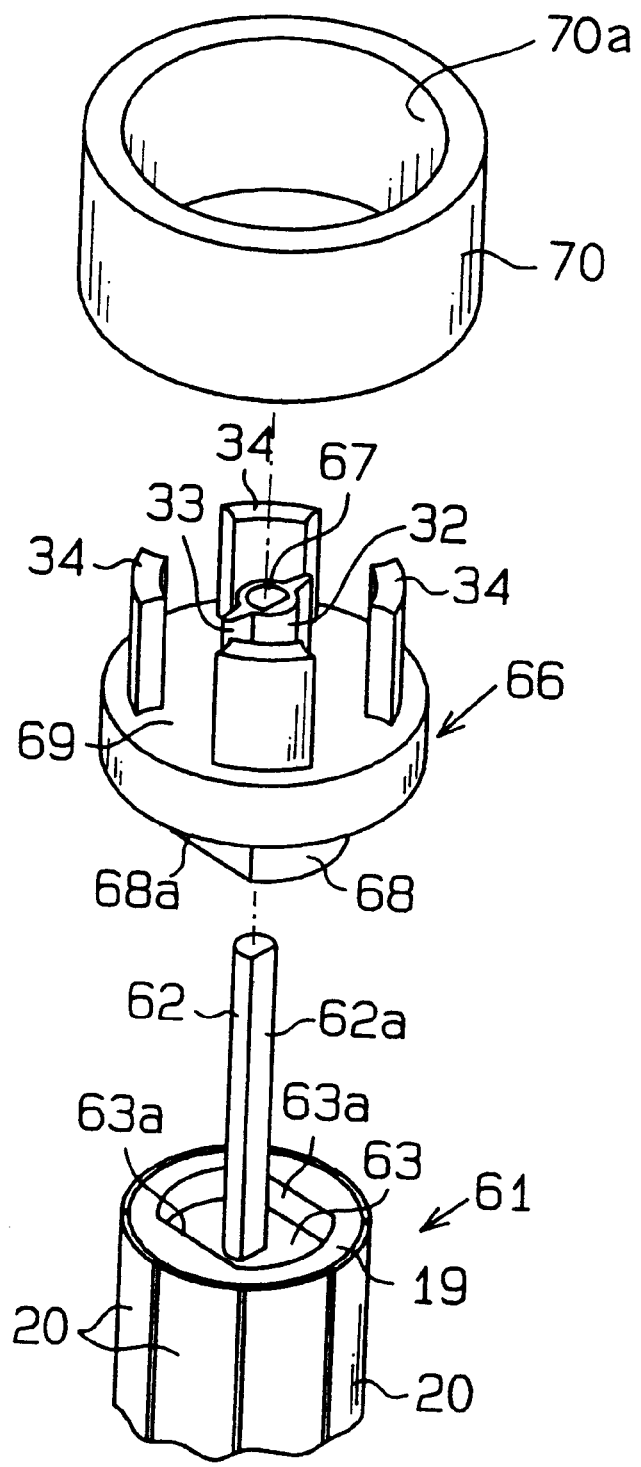
FIG. 12 is a fragmentary exploded perspective view of the clutch according to the second embodiment.

As shown in FIG. 12, commutator 61 has generally elliptic engagement cavity 63, and armature shaft 62 has D-shaped cut portion 62*a*. Cavity 63 has parallel side surfaces 63*a*. Drive member 66 has D-shaped engagement hole 67 to which armature shaft 62 is fitted and male flange 68 having parallel side surfaces 68*a* which are fitted to engagement cavity 63. Thus, drive member 66 and commutator 61 are connected by two engagement means to rotate together.

However, one engagement means can be omitted according to circumstances. Drive member 66 and armature shaft 62 can be connected in various manners. Drive member 66 can have a male flange instead of the elliptic engagement cavity, which can be formed at commutator 61. Drive member 66 and commutator 61 can be molded integrally.

Drive member 66 has disk portion 69 whose outside diameter is larger than teeth 34. Joint housing 70 rotatably supports disk portion 69 at an inner periphery 70*a*, which has approximately the same inside diameter same as the outside diameter of disk portion 69. Driven member 24 is coupled with drive member 66 in the same manner as the first embodiment and housed in joint housing, thereby forming clutch 21. The outer periphery of housing 70 is force-fitted to joint chamber 71 formed at cylindrical projection 57, in the same manner as the first embodiment. Worm shaft 26 is supported by bearing 72 at one end. Joint housing 70 can be fixed to brush holder 16 instead of gear housing 41. Bearing 72 can be formed separately or integrally.

Thus, joint housing 70 indirectly supports armature shaft 62, so that run-out of armature shaft 62 can be effectively controlled.

Figure 11B:
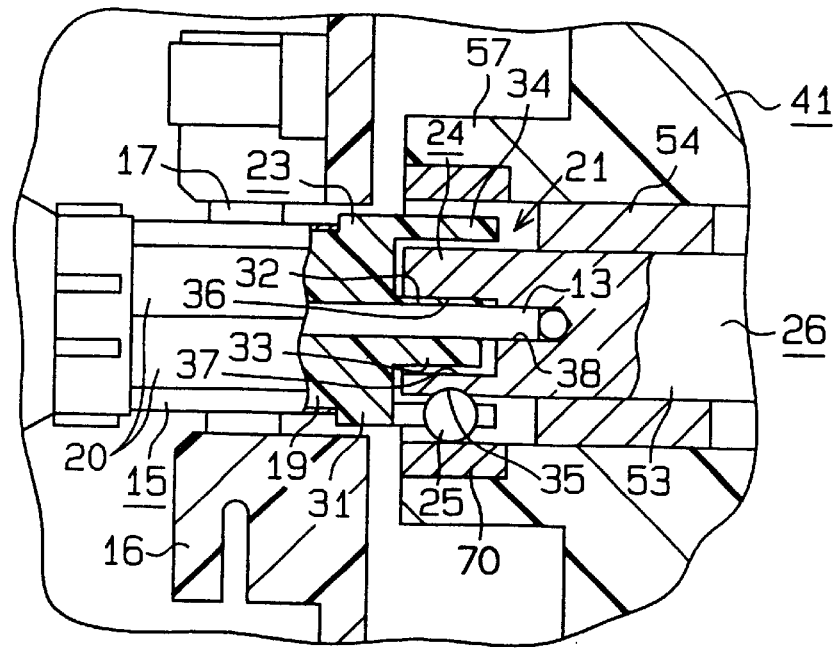
FIG. 11B is a fragmentary cross-sectional side view of a variation of the clutch shown in FIG. 11A.

On the other hand, the disk portion of drive member can have approximately the same outside diameter as the outside diameter of teeth 34, as shown in FIG. 11B.

(Variations)

Figure 13:
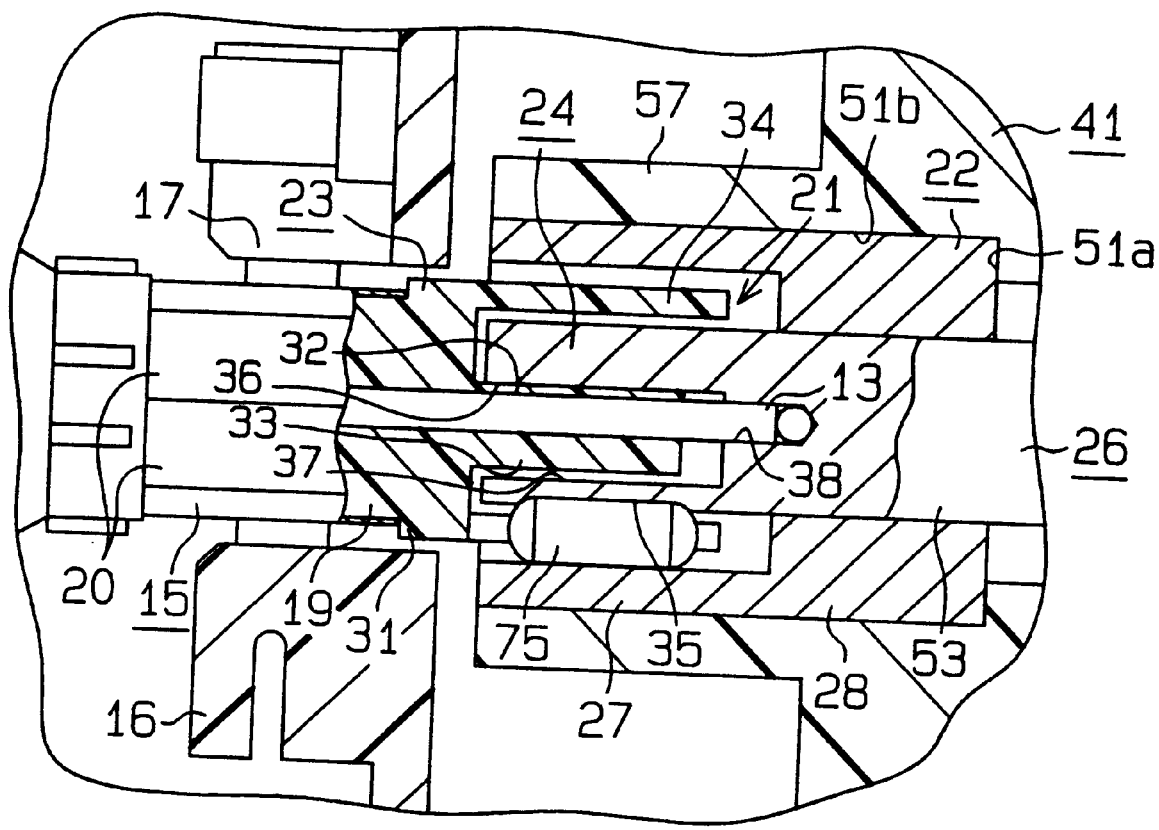
FIG. 13 is a fragmentary cross-sectional side view of a variation of the motor according to the invention.

Balls 25 can be substituted by rollers 75, as shown in FIG. 13. Rollers 75 can withstand much stronger torque than balls 25, so that the window can be effectively prevented from opening by force. The number of balls 25 and teeth 34 can be reduced or increased according to circumstances.

Figure 14:
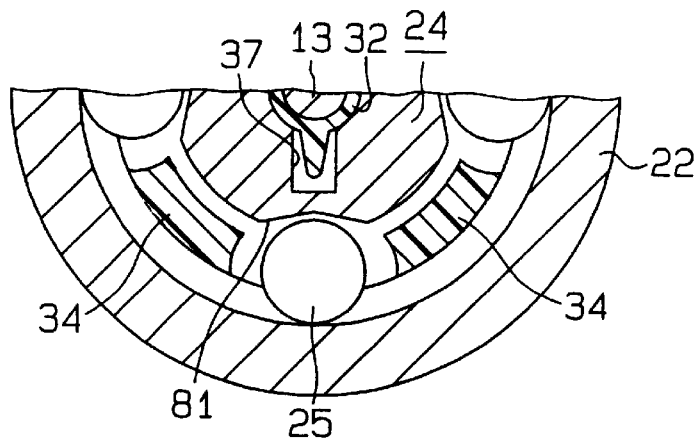
FIG. 14 is a fragmentary cross-sectional plan view of a variation of the motor according to the invention.
Figure 15:
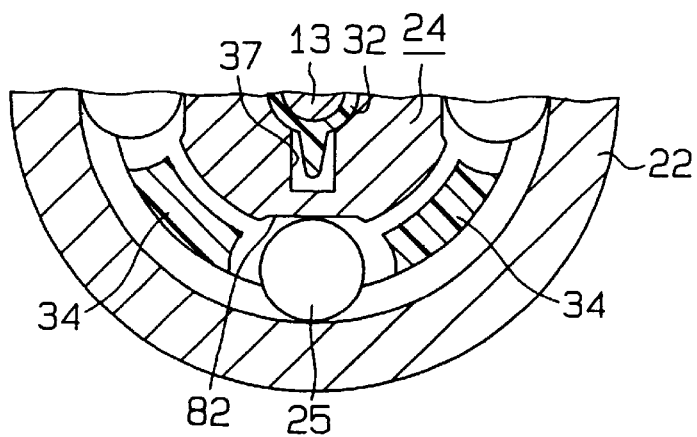
FIG. 15 is a fragmentary cross-sectional plan view of a variation of the motor according to the invention.
Figure 16:
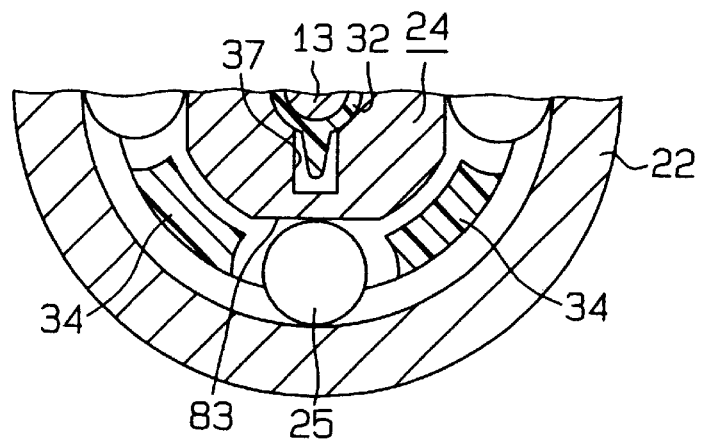
FIG. 16 is a fragmentary cross-sectional plan view of a variation of the motor according to the invention.

Control surface 35 can be changed to be shallow V-shape surface 81 as shown in FIG. 14, shallow U-shaped surface 82 as shown in FIG. 15, or flat surface 83 as shown in FIG. 16.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A motor comprising:
    a motor section including an armature and an armature shaft;
    an output section including a worm mechanism having a worm shaft, a worm bearing supporting said worm shaft coaxially with said armature shaft; and a one-way clutch disposed between said armature shaft and said worm shaft, said clutch including a drive member connected to said armature shaft, a driven member coupled with said drive member and connected to said worm shaft, and a clutch housing for accommodating said drive member and driven member; wherein said clutch housing integrally includes said worm bearing.

2. The motor as claimed in claim 1, wherein:

said one-way clutch includes a rotary member disposed between said driven member and said housing; and said drive member controls location of said rotary member to restrict said driven member if said drive member is rotated by said driven member, and to make said driven member free if said driven member is rotated by said drive member.

3. The motor as claimed in claim 2, wherein said driven member has a plurality of control surfaces, and said rotary member is disposed between one of said plurality of control surfaces and said clutch housing.

4. The motor as claimed in claim 3, wherein said control surface provides a different distance between said control surface and said clutch housing as said location of said rotary member changes.

5. The motor as claimed in claim 3, wherein said control surface has a surface providing a shorter distance between said control surface and said clutch housing as said rotary member leaves a center thereof.

6. The motor as claimed in claim 3, wherein said plurality of control surfaces are each formed as one of a shallow V-shaped surface, a shallow U-shaped surface, and a flat surface.

7. The motor as claimed in claim 2, wherein said drive member has a plurality of guide surfaces for controlling location of said rotary member.

8. The motor as claimed in claim 1, wherein:

said one-way clutch includes a rotary member disposed between said driven member and said clutch housing; and force is transferred from said drive member to said rotary member, moving said rotary member in the same direction as said drive member.

9. The motor as claimed in claim 8, wherein said rotary member is disengaged from first and second guide surfaces if said driven member rotates said drive member.

10. The motor as claimed in claim 9, wherein if a force is exerted on a window while said motor is not turned on, said driven member is stopped from further rotating, and said window is not opened further.

11. The motor as claimed in claim 8, wherein said rotary member comprises a plurality of balls.

12. The motor as claimed in claim 8, wherein said rotary member comprises a plurality of rollers.

13. A motor comprising:

a motor section including an armature and an armature shaft;

an output section including a worm mechanism having a worm shaft disposed coaxially with said armature shaft;

a one-way clutch disposed between said armature shaft and said worm shaft, said clutch including a drive member connected to said armature shaft, a driven member connected to said worm shaft, and a clutch housing for accommodating said drive member and driven member; and wherein said clutch housing integrally includes a drive-member bearing for rotatably supporting said drive member.

14. The motor as claimed in claim 13, wherein said output section comprises a worm housing and a worm bearing fixed to said worm housing to support said worm shaft coaxially with said armature shaft.

15. A motor comprising:

a motor section including an armature, a commutator, and an armature shaft;

an output section including a worm mechanism having a worm shaft, a worm bearing supporting said worm shaft coaxially with said armature shaft; and a one-way clutch disposed between said armature shaft and said worm shaft, said clutch including a drive member having at least a pair of guide surfaces and connected to said armature shaft, a driven member coupled with said drive member and connected to said worm shaft, a stationary housing for accommodating said drive member and driven member, and a rotary member disposed between said driven member and stationary housing and between said pair of guide surfaces; wherein said drive member and said commutator are fixed together.

16. The motor as claimed in claim 15, wherein one of said drive member and said commutator has a male-coupling portion, and the other has a female-coupling portion.

17. The motor as claimed in claim 15, wherein one of said drive member and said driven member has a male-coupling portion, and the other has a female-coupling portion.

18. The motor as claimed in claim 15, wherein said drive member and said commutator are integrated into a unit.

19. The motor as claimed in claim 15, wherein said driven member and said worm shaft are integrated into a unit.

20. A motor comprising:

a motor section including an armature, a commutator, and an armature shaft;

an output section including a worm mechanism having a worm shaft, a worm bearing supporting said worm shaft coaxially with said armature shaft; and a one-way clutch disposed between said armature shaft and said worm shaft, said clutch including a drive member having at least a pair of guide surfaces and connected to said armature shaft, a driven member coupled with said drive member and connected to said worm shaft, a stationary housing for accommodating said drive member and driven member, and a rotary member disposed between said driven member and stationary housing and between said pair of guide surfaces; wherein said motor section and said clutch are connected by a common member.

* * * * *